No. 746,045. Patented December 8, 1903.

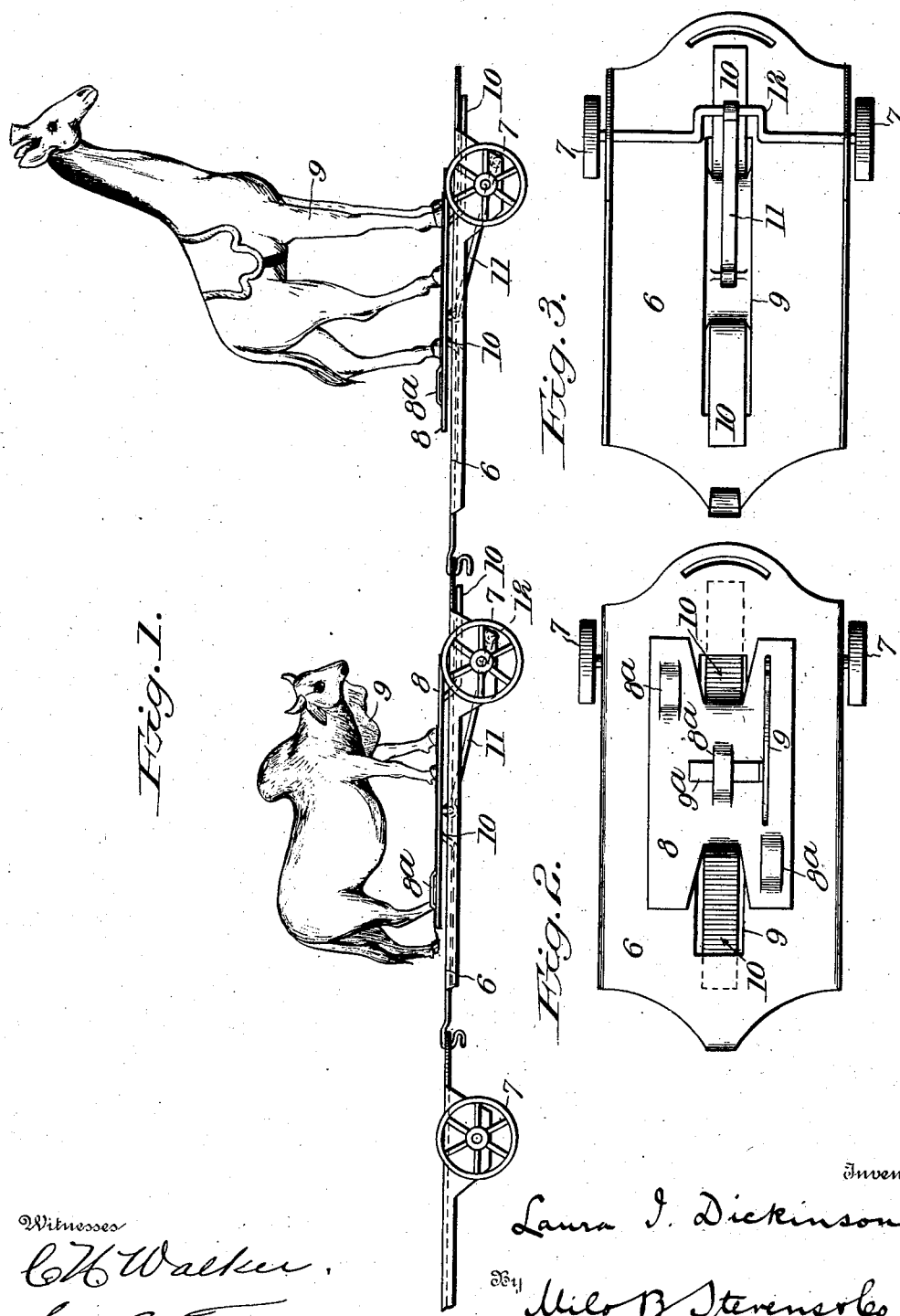

UNITED STATES PATENT OFFICE.

LAURA I. DICKINSON, OF CHICAGO, ILLINOIS.

WHEELED TOY.

SPECIFICATION forming part of Letters Patent No. 746,045, dated December 8, 1903.

Application filed May 5, 1903. Serial No. 155,746. (No model.)

*To all whom it may concern:*

Be it known that I, LAURA I. DICKINSON, a citizen of the United States, residing at Chicago, in the county of Cook and State of Illinois, have invented certain new and useful Improvements in Wheeled Toys; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wheeled toys, and comprises a carriage or truck having thereon a reciprocating plate, upon which figures of animals may be mounted. The plate is operated by connection to a crank-axle, and its motion serves to give the animals a forward-and-backward movement in imitation of walking or running.

In the accompanying drawings, Figure 1 is a side elevation showing two trucks coupled together and illustrating the manner in which the train of trucks may be joined to show a line of animals. Fig. 2 is a top plan view of one of the trucks, and Fig. 3 is a bottom plan view thereof.

Referring specifically to the drawings, the truck-platform is indicated at 6, mounted upon a single pair of wheels 7 at one end thereof. Another set of wheels may be added, if desired, although when a train of trucks are joined together they will support each other on one set of wheels. Upon the platform is a plate 8, to which the animal figures 9 are attached. This plate works over a slot 9 in the platform and has tongues 10, which project through said slot and under the platform to hold the plate thereto and to guide it in its movements. The plate is moved back and forth by a connection 11 to the crank-axle 12. The animal figures are conveniently formed of paper and are attached to the plate by means of a laterally-extending foot-piece $9^a$, which enters slits $8^a$, produced in the plate. Several of these slits are made, so that several animals may be attached to the same plate. The foot-pieces may be readily slipped in or out of the slits, so that the animal figures can be detached or rearranged at the pleasure of the child. As the trucks are drawn along the plates slide back and forth, giving a corresponding movement to the figures mounted thereon in imitation of lifelike movements.

What I claim as new, and desire to secure by Letters Patent, is—

1. A toy comprising a wheeled platform, a reciprocating plate driven by the wheels slidable on the top of the platform, and a figure detachably mounted on the plate.

2. In a toy, the combination with a wheeled truck, and a reciprocating plate slidable thereon and having slits therein and a driving connection with the wheels, of a detachable figure having a foot-piece extending into the slits.

3. A toy comprising a wheeled and slotted platform, a plate resting flatly and slidable back and forth thereon, over the slot, and having guides projecting into the slot and a driving connection with the wheels, and a figure mounted on the plate.

In testimony whereof I affix my signature in presence of two witnesses.

LAURA I. DICKINSON.

Witnesses:
SIGNA FELTSKOG,
H. G. BATCHELOR.